Nov. 26, 1963   J. E. ANDERSON   3,111,850

ACCELERATION SENSING MEANS
Filed June 23, 1959

INVENTOR.
JOHN EDWARD ANDERSON

BY Roger W. Jensen

ATTORNEY

United States Patent Office 3,111,850
Patented Nov. 26, 1963

3,111,850
ACCELERATION SENSING MEANS
John E. Anderson, Minneapolis, Minn., assignor to Minneapolis-Honeywell Regulator Company, Minneapolis, Minn., a corporation of Delaware
Filed June 23, 1959, Ser. No. 822,313
3 Claims. (Cl. 73—517)

This invention relates to the field of inertial instruments and more particularly to the elimination of cross-coupling acceleration components in a pendulous accelerometer.

Generally, an inertial instrument comprising a pendulous accelerometer is responsive to an acceleration in a particular direction so that its acceleration responsive element is rotated about an axis perpendicular to this direction of acceleration. Since the acceleration responsive device has a pendulous mass which is pivoted about an output axis, any acceleration sensed by the pendulous mass will result in a torque thereto about an output axis, or the rotational axis, resulting in an angular movement of the pendulous mass. Usually, a signal generator attached to a gimbal assembly which rotates about the output axis senses rotation of the pendulous mass and a signal therefrom is applied to a torque generator, also connected to the gimbal assembly, to return the pendulous element toward its position of rest. That is, the signal from the signal generator is of such a sense and magnitude that the rotation caused by acceleration is substantially wiped out by a counter torque produced by the torque generator. When devices of this type are used with craft having high accelerations, they are oftentimes subjected to an error caused by the shifting of the acceleration sensitive direction of the pendulous element away from the normal direction in which the instrument senses the accelerations. Once the pendulous mass is rotated through some angle, accelerations at right angles to the acceleration sensitive and output axes act to produce a subsequent torque about the output axis thereby adding an error to the sensed acceleration. It is this unwanted lateral acceleration acting in a plane which would normally contain the output axis and the radius arm of the pendulous mass when at rest, that is known as cross-coupling acceleration. The cross-coupling accelerations can produce errors in the output of the device and therefore produce an erroneous indication of the acceleration sensed by the accelerometer.

One method of correcting the cross-coupling acceleration is to use an exceedingly high loop gain in the instrument servo loop connecting the signal generator to the torque generator, however a servo loop of this type is also sensitive to high frequency accelerations, which are unwanted and thus the problem is really not solved by using high gain after all.

The present invention corrects the effects of cross-coupling acceleration by rotating the pendulous accelerometer at a substantially constant rate about its input axis so that any cross-coupling acceleration effects appearing in the output signal from the instrument are of an oscillatory nature and therefore have an average value of zero over any given oscillatory period. In other words, the errors created by cross-coupling acceleration are no longer of one sense, or phase, as has been the case in the prior art but are of a varying sense or phase and average a zero value over a complete cycle.

Therefore, a general object of the present invention is to provide an acceleration responsive device which has improved response characteristics by substantially eliminating cross-coupling acceleration errors.

A further object of the present invention is to provide a pendulous accelerometer which may be rotated on a turntable to effectively eliminate errors due to cross-coupling acceleration.

It is another object of the present invention to relax the requirements of high servo loop gain because larger gimbal deflections can be tolerated when the accelerometer is rotated.

It is yet another object of the present invention to provide a more accurate means of defining an effective input axis of the pendulous accelerometer.

These and other features will become more apparent from the following detailed description and accompanying drawing in which.

Figure 1:
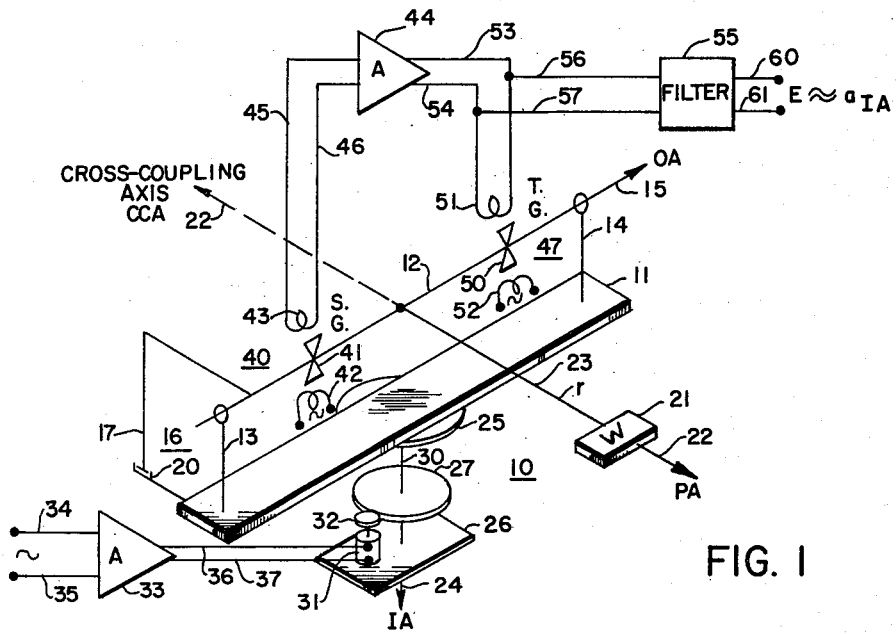
FIGURE 1 is a schematic representation of a pendulous accelerometer mounted upon a turntable.

Referring to FIGURE 1, reference numeral 10 designates a pendulous accelerometer mounted on a platform. The pendulous accelerometer includes a case or base means 11 and a gimbal assembly 12. The support for gimbal assembly 12 to facilitate rotation relative to the case 11 is schematically shown by a pair of supports 13 and 14 which define a pivotal or output axis (OA) 15. It will be understood that in the usual case (although the invention is not limited thereto) the pendulous accelerometer is floated in a damping fluid such as set forth in the Jarosh et al. Patent 2,802,956 which issued August 13, 1957. The inherent viscous damping produced by floating gimbal 12 with respect to case 11, is schematically represented by a damper 16 including a movable member 17 which is connected to gimbal assembly 12, and a fixed member 20 which is connected to case 11. Gimbal assembly 12 is made pendulous by the addition of a suitable mass M, or weight W, identified by reference numeral 21 which is mounted eccentrically on the gimbal assembly and is so positioned that the direction of its pendulosity under normal conditions defines a pendulous axis (PA) 22. The pendulous axis is at right angles to the output axis and is seen to lie along a lever arm $r$ also designated as reference 23 which connects gimbal 12 to mass 21. The pendulous axis 22 may be further defined since under conditions of no acceleration it is at right angles to output axis 15 and is also at right angles to an input axis 24 which is also perpendicular to output axis 15. With the pendulous element 21 arranged as shown in FIGURE 1, gimbal assembly 12 becomes sensitive to acceleration along the input axis 24. Thus the input axis becomes the acceleration sensitive axis for the component.

A cross-coupling axis 22 is defined as being mutually perpendicular to the output axis 15 and input axis 24. Under conditions of no acceleration along the input axis, the pendulosity of the gimbal assembly 12 lies along the cross-coupling axis. As will be explained in more detail below, for this condition, accelerations along the CCA 22 are ineffective to apply a torque to the gimbal tending to cause it to rotate relative to the base while (for conditions of acceleration along the input axis 24) accelerations along the CCA are effective to apply a torque to the gimbal. This later result is caused because when acceleration is applied along the input axis, the gimbal rotates a finite amount relative to the base and the gimbal pendulosity no longer is aligned with the CCA.

Pendulous accelerometer case 11 is mounted on a suitable turntable device 25 and the turntable is mounted for rotation about a turnable axis which pivots on a base 26. The turntable axis is provided by means of a gear train element 27 positioned on a shaft 30. Shaft 30 is rotatably supported by the base 26 and is fixedly connected to turntable 25. The turntable axis is arranged so that it is either parallel with, or aligned with the accelerometer input axis 24. In FIGURE 1, the turntable axis is shown aligned with the accelerometer input axis 24. A servomotor 31 is operably connected between the base 26 and the turntable 25. As shown, motor 31 is mounted on base 26 and includes a pinion gear 32 adapted to mesh and rotate with gear train element 27. For some embodiments, servomotor 31 may be mounted directly on the turntable and would rotate therewith. It will be understood that whenever motor 31 is energized, it will cause relative rotation between turntable 25 and base 26. For the purposes of this invention, motor 31 is driven from a constant current source such as an amplifier 33 which is excited at its input, by a voltage source, through a pair of connecting leads 34 and 35, and the output is connected to motor 31 through a pair of connecting leads 36 and 37.

Means are also provided in this pendulous accelerometer for producing a signal representative of movement or rotation of gimbal assembly 12 about the output axis 15. This signal producing, or signal generating, means is identified by reference numeral 40 and includes a rotor element 41 connected to gimbal assembly 12, and a pair of windings 42 and 43. Winding 42 schematically represents an excitation winding which is energized by a suitable source of alternating current and winding 43 schematically represents a control winding adapted to produce an alternating signal of a phase and magnitude according to the direction and magnitude of rotation of gimbal assembly 12 about output axis 15. Any suitable type of signal producing means will suffice and the invention is not limited to any particular device. A suitable type of signal producing means is shown in the Mueller Patent 2,488,734 issued November 22, 1949. Control winding 43 of signal generator means 40 is connected to the input of an amplifier 44 by a pair of suitable connecting means 45 and 46. In the normal preferred mode of operation just described, rotor element 41 of signal generator 40 produces a signal upon relative rotation of gimbal element 12 to case 11 thereby causing a signal to be applied to amplifier 44 where the signal is amplified and is used to cause the rotor element of a torque generator 47 to be rotated. Torque generator 47 is provided to rotate gimbal assembly 12 about the output axis 15 and thereby restore pendulous element 21 toward its normal position. Torque generator 47 comprises a rotor element 50 which is attached to gimbal assembly 12, a control winding 51, and an excitation winding 52. Torque generator 47 may also be of the type shown in the Mueller patent. Excitation winding 52 is excited by a suitable source of alternating current and control winding 51 is energized by a signal of variable phase and magnitude to cause rotation of gimbal assembly 12 about output axis 15. This signal is provided from the output of amplifier 44 through a pair of connecting leads 53 and 54 and is of the correct phase and magnitude to cause torque generator 47 to rotate gimbal assembly 12 in a direction and through an angle which is equal and opposite to that produced by the initial acceleration. The current required to produce the torque opposing the torque created by the input acceleration, is a measure of the acceleration applied to the pendulous accelerometer and this information is applied to a filter 55 through a pair of connecting leads 56 and 57 which are connected to amplifier leads 53 and 54 respectively. Filter 55 may be a passive type network or may take the form of an integrator circuit for certain inertial applications, however its form is not critical in the application of the invention. The signal emerging from the filter 55 is proportional to the acceleration sensed along input axis 24 and this is obtained on a pair of output connecting leads 60 and 61.

Figure 2:
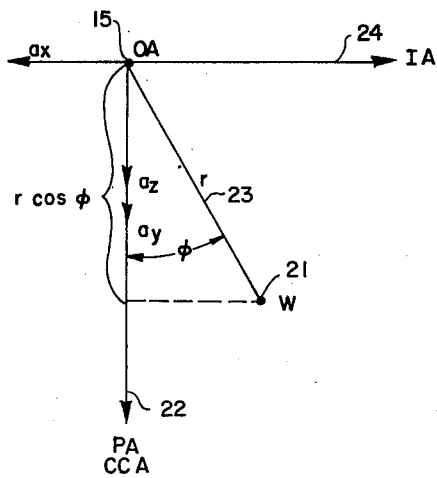
FIGURE 2 is a line diagram showing the relative positions of the various axes of the pendulous accelerometer as seen looking into the output axis.
Figure 3:
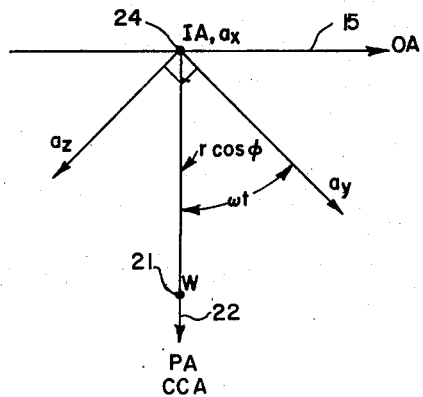
FIGURE 3 is a similar diagram as seen looking into the input axis of the pendulous accelerometer.

Viewing FIGURE 2 it is seen that pendulous mass 21 has rotated through an angle $\phi$ from a mean position on pendulous axis PA in a plane which includes input axis 24, and which is perpendicular to output axis 15. Thus it appears that an acceleration $a_x$ which is in a direction parallel with input axis 24 has caused pendulous element 21 to swing counter-clockwise about output axis 15. While pendulous mass 21 is in the position shown in FIGURE 2, if it is rotated about the input axis at a given rate which will be designated as $\omega$ during a given period of time, it will turn through an angle designated as $\omega t$ as seen in FIGURE 3. Accelerations may occur along any of three orthogonal axes referred to the base plate, where $a_x$ is aligned along the input axis IA, and $a_y$ and $a_z$ lie in the plane of the pendulous axis (PA) and the output axis (OA). The angle $\omega t$ has then been used to reference the rotation of the pendulous axis with respect to the $a_z$ and $a_y$ components of base-plate acceleration. By summing the torques about output axis 15 it will be seen that the torque is equal to:

$$T_{OA} = m[(r\omega^2 \cos \phi - a_y \cos \omega t - a_z \sin \omega t) \sin \phi - a_x \cos \phi] - c\dot{\phi} - k\phi \quad (1)$$

Where $c$ is the damping constant of the pendulum and $k$ is the stiffness of the servo loop which provides torque to return pendulous element 21 towards pendulous axis 22, or in other words to reduce $\phi$ towards a zero value.

Upon further manipulation where the torque T is equal to the moment of inertia I of the pendulum about the output axis OA multiplied by rotational acceleration $\ddot{\phi}$ it may be seen that $$I\ddot{\phi} + c\dot{\phi} + k\phi = m[(r\omega^2 \cos \phi - a_y \cos \omega t - a_z \sin \omega t) \sin \phi - a_x \cos \phi] \quad (2)$$

For small angles of $\phi$ it may be seen that $\sin \phi \cong \phi$ and $\cos \phi \cong 1$. Therefore $$I(\ddot{\phi}) + c\dot{\phi} + (k - r\omega^2)\phi = -a_x - \phi(a_y \cos \omega t + a_z \sin \omega t) \quad (3)$$

By examination it may be seen that the output of the pendulous accelerometer is equal to the acceleration applied in the direction of the input axis, minus a quantity representative of the cross-coupling acceleration component. However, it may be noted that the cross-coupling acceleration components are now a sine or cosine function, variable with time, and therefore the cross-coupling errors are oscillatory and when averaged over a given period result in a zero error. It may be further seen that by rotating the pendulous accelerometer, that the stiffness term $k$ is modified slightly by the rotational speed and therefore the best results may be obtained by a constant rotation of the platform. When the platform is rotated at a constant speed the stiffness term may be corrected by a slight change in scale factor to give the desired output result.

*Operation*

In operation, the accelerometer is placed on a rotatable platform such as turntable 25 and is rotated generally at a constant speed or a predetermined speed which is known. This might also be referred to as the reference speed, because if the speed is known to vary by a certain amount, compensation may be made for the variations in the speed of the motor. For the present embodiment, it will be assumed that motor 31 is of a synchronous type and is driven by a constant current source from amplifier 33 to provide constant speed rotation of turntable 25 which mounts pendulous accelerometer case 11. As an acceleration is sensed along input axis 24, pendulous mass 21 will be rotated about output axis 15 and a signal will be applied to amplifier 44. The amplifier will provide a signal of proper phase and magnitude so that torque generator 47 may apply an equal and opposite torque to gimbal 12 and thereby restore pendulous mass 21 substantially to the pendulous axis 22. It may be seen that for a greater acceleration, a greater torque will be required by torque generator 47 and therefore a greater current will be supplied to control winding 51 of torque generator 47. Since certain lateral errors due to cross-coupling accelerations, such as shown in FIGURE 3 as $a_y$ and $a_z$, are generally present, a certain cross-coupling acceleration term will appear in the output of amplifier 44 but it will be seen to be an oscillatory acceleration signal. It may also be seen that since the angle $\phi$ is relatively small, that the term itself will be relatively small and for some applications will not require any filter action. For other applications, such as where a pendulous accelerometer is used in an inertial system, filter 55 will take on the form of an integrator and thereby produce a filtering action. For other applications, it may be necessary to filter the oscillatory components caused by cross-coupling acceleration so that an output signal which appears on output terminals 60 and 61 will be representative of the input acceleration which is in the direction of input axis 24. By employing this scheme it may be seen that larger gimbal deflections can be tolerated and that a lower loop gain is required between signal generator 40 and torque generator 47, while at the same time eliminating the troublesome cross-coupling acceleration component.

While I have shown and described a specific embodiment of this invention, the invention should not be limited to the particular form shown, and I intend in the appended claims to cover all modifications which do not depart from the spirit and scope of the invention.

What I claim is:

1. An inertial sensor for sensing acceleration comprising: base means; a pendulous member mounted on said base means for relative rotation therewith about an output axis, said member being adapted to rotate relative to said base means about said output axis in response to the components of acceleration along an input axis perpendicular to said output axis; signal generating means, said signal generating means producing an output signal indicative of the rotation of said member relative to said base means away from a normal position; torque generating means, said torque generating means being connected in part to said member and operable in response to said output signal and producing a force tending to return said member to said normal position relative to said base means; and means independent of said pendulous member connected to said base means and adapted to rotate said base means at a substantially constant angular velocity about said input axis.

2. An inertial sensor having mutually perpendicular output, input, and cross-coupling axes comprising: base means; a pendulous member mounted on said base means for relative rotation therewith about said output axis, said member being normally oriented relative to said base so that the pendulosity thereof is aligned with said cross-coupling axis and perpendicular to said input axis, and said member responding to acceleration along said input axis by rotating about said output axis to a position at which said pendulosity is mis-aligned with said cross-coupling axis so that a simultaneous acceleration along said cross-coupling axis is effective to apply a torque to said pendulous member; signal generator means effective to produce a signal indicative of relative rotation between said base means and said member; and means independent of said pendulous member connected to said base means and adapted to rotate said base means at a substantially constant angular velocity about an axis parallel to said input axis causing signals produced by cross-coupling accelerations to become oscillatory.

3. An inertial sensor having mutually perpendicular output, input, and cross-coupling axes comprising: base means; a pendulous member mounted on said base means for relative rotation therewith about said output axis, said member being normally oriented relative to said base so that the pendulosity thereof is aligned with said cross-coupling axis and perpendicular to said input axis, and said member responding to acceleration along said input axis by rotating about said output axis to a position at which said pendulosity is mis-aligned with said cross-coupling axis so that a simultaneous acceleration along said cross-coupling axis is effective to apply a torque to said pendulous member; signal generator means effective to produce a signal indicative of relative rotation between said base means and said member; and means independent of said pendulous member connected to said base means and adapted to rotate said base means at a reference angular velocity about an axis parallel to said input axis causing signals produced by cross-coupling accelerations to become oscillatory.

References Cited in the file of this patent

UNITED STATES PATENTS

| | | |
|---|---|---|
| 2,319,940 | Marrison | May 25, 1943 |
| 2,648,055 | Smith et al. | Aug. 4, 1953 |
| 2,853,287 | Draper et al. | Sept. 23, 1958 |
| 2,928,667 | Peterson | Mar. 15, 1960 |
| 3,014,374 | Johnston | Dec. 26, 1961 |

FOREIGN PATENTS

| | | |
|---|---|---|
| 3,353/31 | Australia | Aug. 4, 1932 |
| 791,827 | Great Britain | Mar. 12, 1958 |